United States Patent
Chaturvedi et al.

(10) Patent No.: US 10,484,943 B2
(45) Date of Patent: *Nov. 19, 2019

(54) POWER MANAGEMENT OF A PERSONAL AREA FABRIC

(71) Applicant: NANT HOLDINGS IP, LLC, Culver City, CA (US)

(72) Inventors: Rahul Chaturvedi, San Diego, CA (US); Thomas Wittenschalaeger, Flowery Branch, GA (US); Patrick Soon-Shiong, Los Angeles, CA (US)

(73) Assignee: NANT HOLDINGS IP, LLC, Culver City, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 15/729,426

(22) Filed: Oct. 10, 2017

(65) Prior Publication Data

US 2018/0035370 A1 Feb. 1, 2018

Related U.S. Application Data

(63) Continuation of application No. 14/455,775, filed on Aug. 8, 2014, now Pat. No. 9,820,221.
(Continued)

(51) Int. Cl.
*H04W 52/02* (2009.01)
*H04W 84/10* (2009.01)

(52) U.S. Cl.
CPC ... *H04W 52/0206* (2013.01); *H04W 52/0219* (2013.01); *H04W 52/0229* (2013.01); *H04W 84/10* (2013.01); *Y02D 70/00* (2018.01); *Y02D 70/142* (2018.01); *Y02D 70/144* (2018.01); *Y02D 70/146* (2018.01);
(Continued)

(58) Field of Classification Search
CPC ......... H04W 52/0206; H04W 52/0229; H04W 52/0219; H04W 84/10
See application file for complete search history.

(56) References Cited

U.S. PATENT DOCUMENTS

| 8,448,001 B1 | 5/2013 | Zhu et al. |
| 8,479,028 B2 | 7/2013 | Tsai et al. |

(Continued)

FOREIGN PATENT DOCUMENTS

| KR | 10-2011-0007205 | 1/2011 |
| WO | 2005-069545 | 7/2005 |

OTHER PUBLICATIONS

Blanquicet et al., Managing Energy Use in a Network with a New SNMP Power State MIB, 2008. (Year: 2008).*
(Continued)

*Primary Examiner* — Oussama Roudani
(74) *Attorney, Agent, or Firm* — Stetina Brunda Garred and Brucker

(57) ABSTRACT

A power management system for a personal area fabric having a plurality of nodes is presented. The system implements power management functions at the fabric-level via fabric-level power profiles reflecting the aggregated power profiles from some or all of the nodes in the fabric. The fabric-level power profiles are used to trigger the implementation of fabric power configurations that cause the individual nodes to modify their operations in the interest of a fabric-level power management plan.

39 Claims, 4 Drawing Sheets

Related U.S. Application Data

(60) Provisional application No. 61/863,690, filed on Aug. 8, 2013.

(52) U.S. Cl.
CPC .......... *Y02D 70/162* (2018.01); *Y02D 70/164* (2018.01); *Y02D 70/166* (2018.01); *Y02D 70/22* (2018.01); *Y02D 70/26* (2018.01)

(56) References Cited

U.S. PATENT DOCUMENTS

| | | | |
|---|---|---|---|
| 8,842,615 B1 * | 9/2014 | Kalbag | H04W 72/0486 |
| | | | 370/329 |
| 2009/0046712 A1 | 2/2009 | Nordmark et al. | |
| 2009/0077396 A1 | 3/2009 | Tsai et al. | |
| 2009/0265568 A1 * | 10/2009 | Jackson | G06F 1/3203 |
| | | | 713/320 |
| 2010/0111000 A1 | 5/2010 | Saidi et al. | |
| 2010/0115096 A1 | 5/2010 | Eruchimovitch et al. | |
| 2010/0245172 A1 * | 9/2010 | Gottifredi | H04B 7/2693 |
| | | | 342/357.51 |
| 2011/0176463 A1 | 7/2011 | Cowan et al. | |
| 2011/0299412 A1 * | 12/2011 | Diab | H04L 12/12 |
| | | | 370/252 |
| 2012/0170468 A1 | 7/2012 | La Macchia et al. | |
| 2012/0246458 A1 * | 9/2012 | Jain | G06F 1/3253 |
| | | | 713/100 |
| 2013/0024710 A1 | 1/2013 | Jackson | |
| 2013/0195104 A1 | 8/2013 | Karnowski | |
| 2014/0107493 A1 * | 4/2014 | Yuen | A61B 5/0205 |
| | | | 600/473 |
| 2015/0244578 A1 * | 8/2015 | Grosso | H04L 41/12 |
| | | | 709/223 |

OTHER PUBLICATIONS

ISA/KR, International Search Report and Written Opinion, Int'l Appln No. PCT/US2014/050433 dated Nov. 28, 2014 (9 pages).

Francisco Blanquicet, "SNMP Power State MIB", 2008.

* cited by examiner

POWER MANAGEMENT OF A PERSONAL AREA FABRIC

This application is a continuation of U.S. Application Ser. No. 14/455,775, filed Aug. 8, 2014, now U.S. Pat. No. 9,820,221, which claims the benefit of priority to U.S. provisional application 61/863,690 filed on Aug. 8, 2013 the disclosures of which and all other extrinsic references referenced herein are incorporated by reference in their entirety.

FIELD OF THE INVENTION

The field of the invention is the power management among networked devices.

BACKGROUND

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The development of portable computers, smart phones and tablets has made internet access on-the-go commonplace for many users. It is increasingly common for a user to have more than one of these devices at any given time, and the continued advances in computing and communications technology have opened up the possibility that nearly any object a user might wear or carry can become "smart". A user might have a smart watch, smart jewelry, or computing and communication devices in pieces of clothing, one or more of which may have the capacity to communicate with each other or with the Internet and form a user's personal network or fabric. While such devices have the capacity to network with one another to exchange data with one another and to cooperate to perform tasks for a user, these devices typically lack the ability to cooperate with each other as a network to manage and optimize the functionality and power consumption of the network as a whole on a network level.

Others have put forth effort toward networked power management. For example U.S. patent application 2009/0046712 to Nordmark et al., titled "Predictive Routing Technique in the Ad Hoc Wireless Network," published Feb. 9, 2009, describes a forwarding node that chooses a routing path to minimize the power transmission level required for the forwarding node to forward data packets. Nordmark, however, fails to teach a way to manage power management of multiple nodes in the fabric. Each of Nordmark's nodes function independently from one another.

U.S. patent application 2009/0077396 to Tsai, et al, titled "Techniques for Collaborative Power Management for Heterogeneous Networks," published Mar. 19, 2009 discusses a module that communicates power state information between two nodes so that the two nodes can sync with each other so that both nodes can be in full power mode, low power mode, or off. Tsai, however, fails to disclose power management at a mesh or network level involving three or more nodes.

U.S. Pat. No. 8,448,001 to Zhu, titled "System Having a First Device, and Second Device in Which the Main Power Management Module is Configured to Selectively Supply a Power and Clock Signal to Change the Power State of Each Device Independently of the Other Device," filed Mar. 2, 2010, issued May 21, 2013, describes a system where one device in a network could command another device to change from a high power state to a low power state. Zhu also fails to disclose power management of a mesh or network involving a plurality of nodes.

U.S. patent application 2011/0176463 A1 to Cowan, et al, titled "Managing Power States in Network Communications," published Jul. 21, 2011, discusses sharing power state schedules among nodes, where devices can schedule packets to be sent when a node exits low power mode, or could command a low power node to exit from a sleep state to accept a packet. However, Cowan also fails to teach a network-wide power status or power management at a network level.

U.S. Pat. No. 8,479,028 to Tsai et al., titled "Techniques for Communications Based Power Management," filed Sep. 11, 2008, issued Jul. 2, 2013, discusses an apparatus that turns an entire communications sub-system into an active high power consumption state or a non-active low power consumption state. Tsai, however, fails to allow granular control over network elements when managing the network.

U.S. patent application 2012/0170468 to La Macchia et al., entitled "Power Management in a Wireless Ad Hoc Network," published Jul. 5, 2012, discusses a method of managing power in a network by assigning subsets of the epochs throughout a time period to have high power active states and low power idle states. During high traffic times, the network will have a high power active state, and during low traffic times, the network will have a low power idle state. While La Macchia teaches network-wide power management, La Macchia also fails to allow granular control over network elements when managing the network.

U.S. patent application 2013/0024710 to Jackson, entitled "System and Method for Managing Energy Consumption in a Compute Environment," published Jan. 24, 2013, describes a system and method for reducing power consumption in clusters and grids by predicting future workload, and ensuring that nodes in a grid are idle until they are required to run a queued workload. Jackson, however, fails to recognize that nodes could have a plurality of low-power states suitable for different types of workloads, and that user input could alter a workload schedule dynamically.

Thus, there remains a need for a system and method for an improved network-level power management device to optimize power drain across an entire fabric.

SUMMARY OF THE INVENTION

The inventive subject matter provides apparatus, systems, and methods in which a personal area fabric having a plurality of networked nodes is configured to optimize power drain among the networked nodes in response to a power configuration trigger and/or power configuration criteria received from a user. One aspect of the inventive subject matter includes a personal area fabric comprising a plurality of networked nodes where at least one of the nodes is configured or programmed to operate as a state configuration engine. Each of the networked nodes in the fabric includes a power profile that describes how the node consumes power. Further, the nodes also include one or more communication interfaces through which the node is able to exchange data with other nodes in the fabric. The state configuration engine takes on additional roles or responsibilities with respect to managing power consumption across all the nodes in the fabric. The state configuration engine is configured or programmed to receive a power configuration trigger (e.g., events, conditions, requirements, etc.), possibly from a user via a user interface. The engine further aggregates power profiles from at least a portion of the network nodes to gain an understanding of how the nodes are consuming power in aggregate. The engine uses the aggregated power profiles to derive a fabric-level power configuration that seeks to optimize one or more aspects of power consumption. The engine is further configured or programmed to instruct the portion of the network nodes to operate according to the fabric-level power configuration upon detection of the power configuration trigger.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
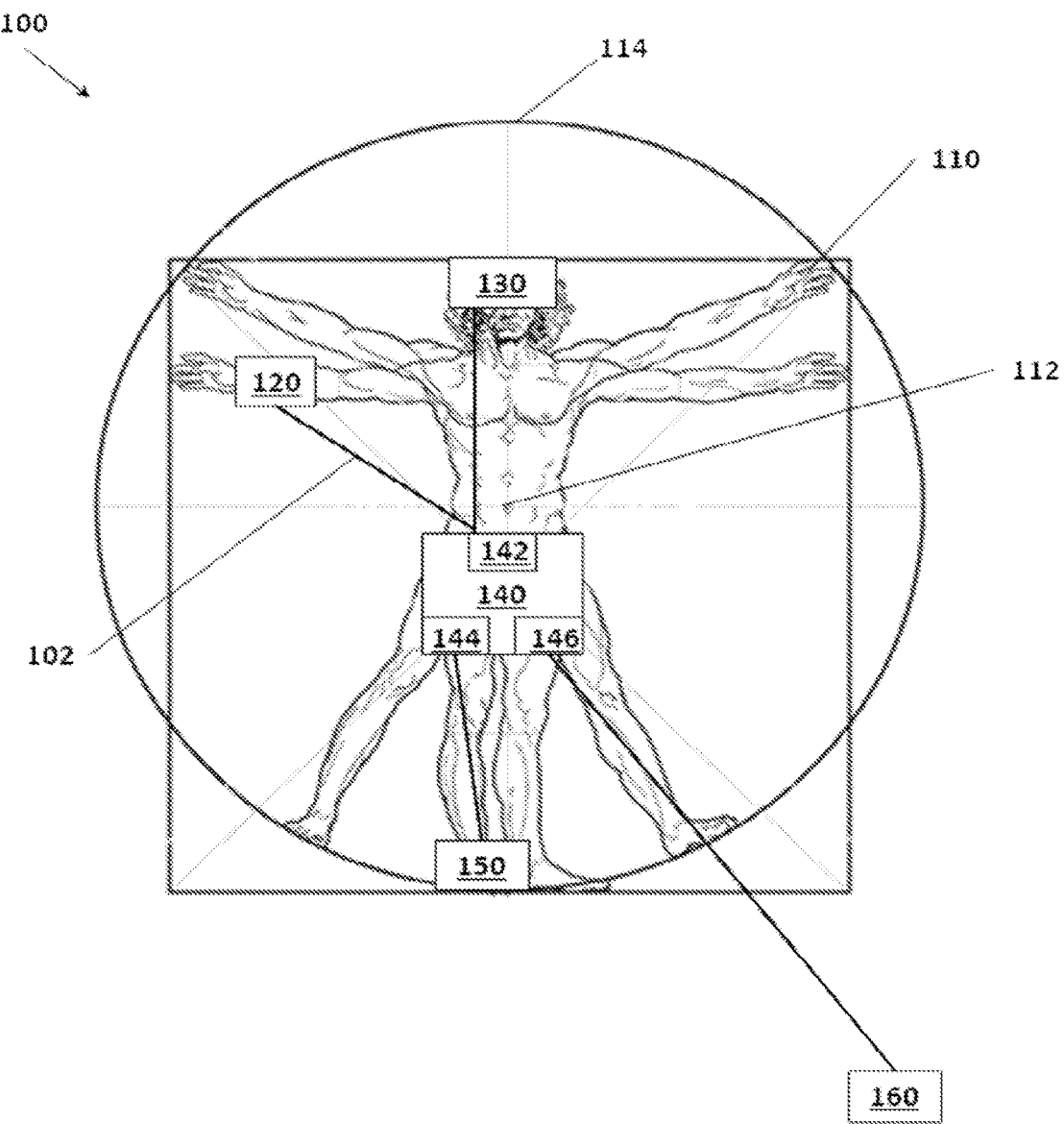
FIG. 1 is an overview of an exemplary personal area fabric.

The inventive subject matter provides apparatus, systems, and methods that enable nodes in a personal area fabric to optimize the overall power drain of the fabric system among networked nodes.

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. The term "functionally coupled to" means two elements that may be indirectly coupled to one another in a manner where one element interacts with the other element, such as a computer functionally coupled to another computer using a wireless router or a satellite functionally coupled to an antenna using a line-of-sight connection.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed. Various objects, features, aspects and advantages of the inventive subject matter will become more apparent from the following detailed description of preferred embodiments, along with the accompanying drawing figures in which like numerals represent like components.

As used herein, a "personal area fabric" comprises a network fabric within 5 meters from a user's Vitruvian centre, and is preferably only within 1 meter from a user's Vitruvian centre and is carried and/or worn by the user. In some embodiments, the "personal area fabric" could comprise devices installed within a vehicle a person is riding in, like a car or motorcycle, but preferably does not extend more than 2 meters further than the seat of a vehicle that carries 6 or more passengers, like a bus, train, or airplane. An example of a personal area fabric could be a network made up of a variety of devices that a person typically would carry with them. These devices can include one or more of a smart phone, tablet, portable computer, smart watch, portable video game consoles, portable media players, smart glasses, cameras, headphones, headsets etc. The devices could also be computing processors and communication interfaces embedded in clothing, jewelry, footwear, etc.

The personal area fabric generally comprises a plurality of networked nodes to form a functionally interconnected mesh or fabric. As used herein, a "functionally interconnected" fabric is a fabric where every node has a communication path to every other node through either a direct connection or an indirect connection through one or more other nodes. The connections could be through wired ports embedded in the wearer's clothes or vehicle, such as USB, HDMI, serial, or coaxial connections, but are preferably wireless connections, such as Bluetooth, WiFi, radio frequency, RFID, WiFi Direct, cellular, infrared, WiMAX, Zigbee, or WiGIG connections. In order to perform long-range communications or communications to nodes or devices outside the fabric, the communication interface could also include one or more long-range communication interfaces such as cellular communication and Wi-Fi. Each node in the fabric typically comprises at least a computer-readable non-transient memory, a processor, a communication interface configured to exchange data with one or more other networked node in the fabric, and computer code saved on the memory with instructions that, when executed by the processor, perform functions. Any suitable computer-readable non-transient memory that allows software instructions to be saved or allows firmware to be flashed could be used, for example a hard disk, a solid state drive, ROM, a programmable EEPROM chip.

Each node within the mesh is typically an entity that routes data. A node could, at the same time, be a device, such as a computing device or system, having the capability to execute computing functions such as storing, playing, rendering, managing, modifying, transmitting, receiving, executing data and data files. Exemplary nodes include routers, smartphones, PDAs, portable media players, gaming systems, speakers, cameras, fitness sensors, smart medical devices, or smart prosthetics.

Each node within a mesh or fabric can include a node profile, such as a node power profile. A node power profile typically includes information about the power/energy consumption or capabilities of the node, such as percentage of battery power left, estimated battery life when the node is in various power states, functionality of node at various power states, historical logs showing use trends of the node, and estimated battery life when a function is constantly or periodically being performed by the node. A node power profile could also contain other information about the node such as node position within the fabric, node position on the body of the user, absolute node position on a map, amount of available transient and non-transient memory, bandwidth, functionality, and node health. Each node generally has at least two power states, but preferably has three, four, or more power states to allow for a variety of power configurations. For example, a cellphone node might have one power state where all communication protocols are active, another power state where WiFi is not active but cellphone and Bluetooth services are active, another power state where all communication protocols are not active, another power state where only Bluetooth services are active. Or a PDA might have one power state where 3 applications are active, another power state where 5 applications are active, and another power state where only 1 application is active.

One or more of the nodes preferably has a state configuration engine that could switch the node's power state from one state to another depending upon changes in the fabric environment. Typically the stimulus for such a change is a power configuration trigger that is received by one or more of the nodes. Preferably the power configuration trigger is received through a user interface of at least one of the nodes, such as a button, a touch-screen, or a menu. In some embodiments, the user could scroll through a list of user-selectable configuration profiles and could select a profile. For example a user could activate an airplane mode that deactivates one or more communication protocols among all of the nodes (e.g., WiFi, Bluetooth, cellphone signals, etc.). A user could manually turn off the airplane mode to turn the communication protocol(s) back on among all of the nodes, or the airplane mode could even be configured to periodically temporarily activate the communication protocol for one or more of those nodes to detect an existence of an access point, and then reactivate the communication protocol among all of the nodes when the existence of the access point is detected. In other embodiments an optimization mode could be configured to minimize the use of communication protocols among the nodes (e.g., allows only one or two nodes to communicate via WiFi or has other Wi-Fi-dependent devices communicate with Wi-Fi through those one or two nodes).

In other embodiments, one or more prioritization modes could be configured to prioritize a functionality of some of the networked nodes over others. For example, while an athlete is snowboarding, that athlete might want to prioritize the functionalities of recording the ride down the mountain and playing music over cellphone service and checking email, and so may want to turn off all WiFi and cellphone services, and may put all devices to sleep except for a camera recording the ride, speakers playing music, and a portable music player sending music to the speakers. Or while a patient is undergoing physical therapy, that patient might want to prioritize the functionalities of recording vital signs and muscle strength and tone over listening to music or taking photos, and may allocate memory from other node devices to help store and log vital sign data. Or, while a user is talking on the phone, that user might not care about listening to music, tracking the user's GPS position, tracking the user's movement, and checking if a WiFi signal is available and may turn off those features of other nodes while prioritizing the functionality of keeping good cellphone service. As such, when a function is prioritized over other functions, the system could be configured to inventory a set of needed hardware from the nodes needed for the functionality, and deactivate the hardware (or portions of the hardware) that are not needed for that functionality.

In other embodiments, instead of the user actively sending the power configuration trigger through a user interface, the user might configure one or more nodes of the personal area fabric to automatically send the trigger in response to an activity of the user. For example, a motion sensor on a foot and/or arm of a user could detect when the user is performing a specified activity, such as jogging, and could then prioritize motion sensors, GPS tracking, and music playing functionality, deactivating hardware which is not normally used or needed while the user is jogging. Or a location sensor could detect if a user enters a workout area and could then prioritize recording vital sign data over other functionalities. Thus, the configuration trigger can comprise criteria that depends on user contextual information, possibly collected based on ambient sensor data collected from the nodes of the personal area fabric or devices external to the personal area fabric.

The state configuration engine manages the fabric by deriving the appropriate fabric-level power configuration for the fabric. This is generally achieved by aggregating node power profiles from some or all of the networked nodes in the fabric, and deriving a fabric-level power configuration as a function of the aggregated node power profiles and the criteria set forth by the power configuration trigger. The fabric-level power configuration generally dictates the power state of each of the analyzed nodes in the fabric in accordance with a schedule. Preferably, each of the nodes has at least two, three, four, five, or more active power states; or even continuous states. As used herein, an "active" power state is a power state where the node is accessible by another node. A power state of "off" is not accessible since another node is unable to turn that node on, but a power state of "sleep" is accessible since another node could wake that node up. As used herein, a "fabric-level power configuration" is a power configuration for the states of four or more nodes in the fabric, and preferably has a configuration of all nodes in the fabric that have a plurality of power states that could be set by the state configuration engine.

The state configuration engine can determine whether a fabric power profile created from a collection of power profiles gathered from one or more of the nodes in the fabric meet power configuration trigger criteria associated with a particular fabric power configuration. If the trigger criteria are met, the state configuration engine can cause the one or more nodes in the fabric to operate according to a fabric power configuration. Generally, the fabric power level configuration is derived as a function of one or more criteria, such as a collective bandwidth budget for a analyzed networked nodes, a collective power budget for the analyzed networked nodes, a collective latency budget for the analyzed networked nodes, a collective caching budget for the analyzed networked nodes, or a collective communication range budget for the analyzed networked nodes. The fabric power configuration could also include one or more of feature management rules, power conservation rules, communication routing rules and data caching rules for the one or more applicable nodes within the fabric. The fabric power configuration could also include a power configuration of a single node within the fabric, a subset of all of the nodes within the fabric or all of the nodes within the fabric.

Once the fabric-level power configuration has been derived by the state configuration engine, the engine sends its instructions to the analyzed networked nodes in the fabric in response to the power configuration trigger, changing the power states of one or more of the nodes to optimize the fabric in accordance with the trigger criteria. Preferably, a fabric has one node designated as the state configuration engine for the entire fabric, making that node a manager of the entire fabric. In some embodiments that state configuration engine could be configured to migrate from one node to another. This is particularly useful if a node having the state configuration engine should optimally be placed in sleep mode in accordance with the fabric-level power configuration. In other embodiments the state configuration engine could be distributed among a plurality of the nodes. In still other embodiments the fabric may comprise a plurality of state configuration engines that communicate with one another, such that one state configuration engine manages one set of nodes, while another state configuration engine manages another set of nodes. Multiple state configuration engines might manage overlapping sets of nodes where one engine manages a first set of functionality among the nodes while the other engine manages a second set of functionality among the nodes.

Within the fabric, one or more nodes could be designated as boundary nodes. As used herein, a "boundary node" of a fabric is a node that is authorized to communicate with a device outside of the network fabric, such as the Internet or a cellphone network. The fabric-level power configuration could designate a subset of the nodes to operate as boundary nodes, where the fabric-level power configuration only allows communication outside the personal area fabric via at least one of those boundary nodes. The boundary nodes can be assigned according to the current conditions and needs of the fabric, such as power status and communication interfaces available. In some embodiments, the state configuration engine chooses a boundary node by deriving a boundary node score for analyzed nodes in the fabric as a function of the node power profiles, selects a set of candidate nodes based upon the score, and then designates one of the nodes as a default boundary node. The boundary nodes can also be assigned according to functions associated with particular nodes, such as specific tasks that certain nodes may perform.

Boundary nodes are particularly useful when a state configuration engine is configured to construct a power configuration for a plurality of fabrics. Using such boundary nodes, the state configuration engine could aggregate power profiles from nodes in other fabrics to minimize power requirements among different devices.

A node within the fabric can be designated as a manager node, giving the state configuration engine of the manager node the authority to cause other nodes to operate according to a particular fabric configuration. The manager node can be designated based on the node power profiles gathered from each node. The designation of the manager node can migrate based on changing conditions of the nodes within the fabric and of the fabric as a whole.

The fabric can be created via ad-hoc networking, allowing for the dynamic introduction of new nodes into the fabric and the removal of nodes from the fabric.

FIG. 1 provides a general overview of a personal area fabric 100. The personal area fabric 100 is worn by a user 110 having a Vitruvian centre 112 and a Vitruvian maximum area 114. As used herein, a "Vitruvian maximum area" of a user is the maximum area around a user that a user could touch with any body part without moving the user's Vitruvian centre. Preferably, the nodes of the personal area fabric are located at most 1 meter away from the Virtruvian centre of a user, but are preferably at most 5 or 10 meters away from the Virtruvian centre of a user. In some sense, the personal area fabric can be considered an informational "halo" that provides information about the user. The personal area fabric 100 is shown as a plurality of nodes composing various devices worn by a user, but could be a plurality of computing devices about a user in the user's vehicle (such as a bicycle or car) without departing from the scope of the invention. Where a user is located within a large vehicle that carries 6 or more passengers, the personal area fabric is preferably limited to an area around the seat that the user is sitting in, and all nodes are preferably within 5 meters from the user. Each of the nodes 110, 120, 130, 140, and 150 are communicatively coupled with at least one other node within the fabric via communication pathways 102. In some embodiments, many of the nodes, for example at least 2, 3, 4, 5, or more of the nodes, share a power source among the nodes.

Each node preferably comprises a non-transient computer-readable memory, a processor, computer-readable instructions to perform functions of the node, and a communication interface allowing the node to communicate with other electronic devices, such as other nodes and communication access points. Node 140 is shown with a wired communication interface 142 functionally connected to nodes 120 and 130, Bluetooth communication interface 144 functionally connected to node 150, and WiFi communication interface 146 functionally connected to an exterior node 160, which is exterior to personal area fabric 100. Communication interfaces used by a node in a personal area fabric are preferably short-range communication interfaces, such as A/V plugs, USB plugs, Bluetooth devices, RFID devices, infrared devices, WiFi devices, NFC interfaces, or other connection; although other communication interfaces could be used without departing from the scope of the invention. Long-range communication devices could also be used to communicate with nodes in the fabric, or with computer devices outside the fabric, such as cellphone towers, an Internet provider, another person's personal area fabric, or a home computer system.

Figure 2:
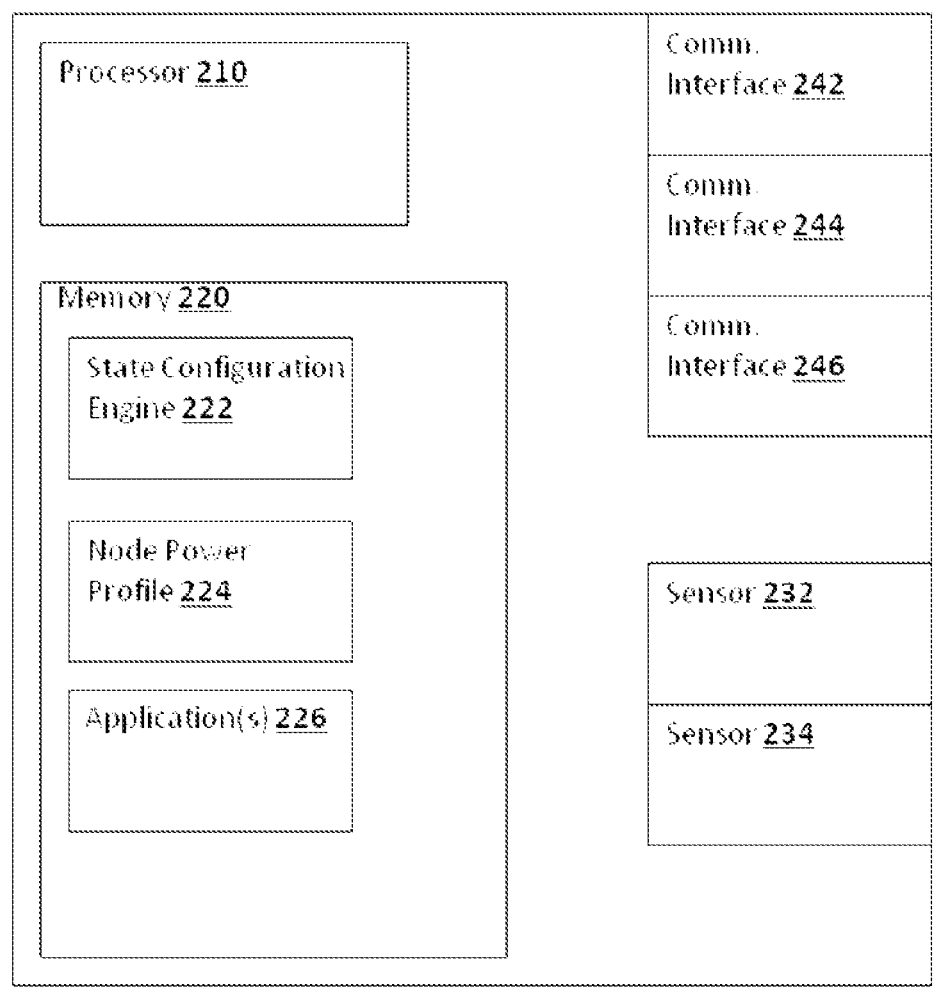
FIG. 2 is a hardware diagram of an exemplary node of FIG. 1.

FIG. 2 provides an overview of node 140 used in a personal area fabric 100. Node 140 generally comprises a processor 210 and memory 220, and can include one or more communication interfaces 242, 244, and 246 (corresponding to communication interfaces 142, 144 and 146 illustrated in FIG. 1), and one or more sensors 232 and 234 (e.g., motion sensors, location sensors, GPS, temperature sensors, image sensors, light sensors, sound sensors, etc.). Processor 210 is generally configured to process software instructions for a state configuration engine 222 that manages at least a portion of the nodes in personal area fabric 100, and is configured to process application instructions 226 to perform other functionality of the computer device. Exemplary nodes include cellular phones capable of exchanging data, PDAs, tablets, portable computers, portable media players, smart watches, exercise monitors, wearable cameras (e.g., a GoPro™ device), GPS devices, portable video game consoles, e-readers, pagers, smart glasses, key fobs, smart cards, electronic toys, headphones, headsets, pacemakers, microphones, blood glucose meters and other portable electronic devices. A node could also include devices such clothing apparel, footwear, jewelry, purses, and backpacks that have embedded computing hardware allowing the node to communicate with other nodes.

The memory also generally contains a node power profile 224 saved in non-transient memory 220, which saves information useful for the state configuration engine to determine the optimal state for that node. Exemplary power profile information includes information about the power/energy consumption of the node while the node is in a power state, the power/energy consumption of the node while the node is performing a specific task, capabilities of the node, percentage of battery power left, estimated battery life when the node is in a power state, functionality of a node at a power state, historical logs showing past use trends of the node, and an estimated battery life when a function is constantly or periodically being performed by a node.

Memory 220 also generally has applications 226 which are used to perform other functions of node 140. Since most nodes are computer system devices, processor 210 is also configured to run one or more applications 226. For example, where a node is a cellphone, an exemplary application could be an application to make a cellphone call. Where a node is a video recording camera, an exemplary application could be an application to record media from a camera. Where a node is a PDA, an exemplary application could be an email application or a web browser that communicates with outside networks using a communication interface.

Communication interfaces 242, 244 and 246 each represent a different type of communication interface used to communicate with other nodes in the personal area fabric, or with other devices outside the personal area fabric. As personal computer system devices become more complex, the number of communication interfaces tends to increase which allows the device to communicate with other computer devices in a plurality of ways. For example, a cellphone might have an audio jack, a Bluetooth antenna, a WiFi antenna, and a cellphone signal antenna. Deactivating one of the communication interfaces might save power and place the node in a different power state, but also limits the capability of the node. Historical stats and data on how the node performs in these various power states could then be saved in node power profile 224, which could give the state configuration engine useful data that allows it to understand how much power would be saved in a state and how limited the node's functionality might be in that state. Such communication interfaces could also include portions of the user's wearable clothing, for example where a user might have a wire that connects speakers embedded in the user's hood with a portable media player located in the user's pocket and a remote control located in the user's lapel.

Sensors 232 and 234 represent data sensors that collect information local to the user of the node. Exemplary sensors include cameras, microphones, accelerometers, gyroscopes, GPS receivers, compasses, conductive leads, PH detectors, or piezoelectric leads. Like communication interfaces, deactivating one or more of the sensors might save power and place the node in a different power state, but also limits the capability of the node. In addition, historical stats and data on how the node performs in these various power states could be saved in power profile 224, which could give the state configuration engine useful data that allows it to understand how much power would be saved in a state and how limited the node's functionality might be in a state where one or more sensors of the node are deactivated.

Figure 3:
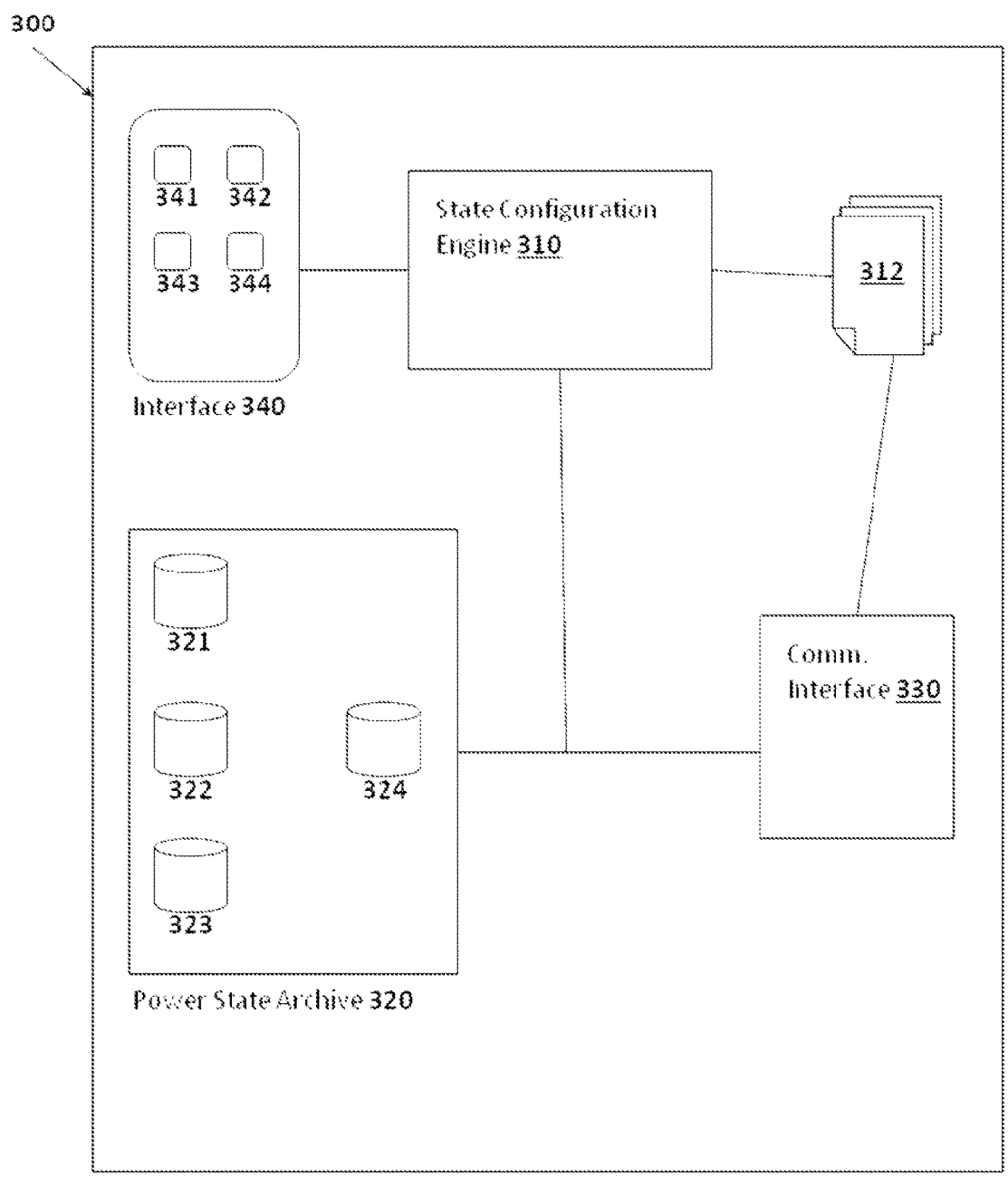
FIG. 3 is a software diagram of modules instantiated by the exemplary node of FIG. 2

FIG. 3 shows a software diagram of software 300 having modules instantiated by processor 210 processing software instructions (such as those of state configuration engine 222 and other applications 226) to operate a node in personal area fabric 100. Software 300 generally has state configuration engine 310, power state archive 320, communication interface 330, and user interface 340. The illustrated embodiment shows user interface 340 as a touch-screen user interface that presents a user (not shown) with a series of choices of different power configurations 341, 342, 343, and 344 to choose from. The user could merely touch one of the power configurations 341, 342, 343, or 344, which would send a trigger event to state configuration engine 310 to change the fabric-level power configuration of personal area fabric 100. Other user interfaces are contemplated, for example a button that is pressed on the user's person, a microphone that detects an audio command spoken by the user, or motion sensors that detect a series of gestures detected by the user.

In other embodiments, user interface 340 could comprise one or more sensors that detect changes to the environment of the user, or actions by the user. For example, nodes 120 and 150 could comprise motion sensors that detect a movement of the user's right arm and right leg, respectively. User interface 340 could be configured to detect the movements of nodes 120 and 150, and detect when the movements of nodes 120 and 150 alternate in a rhythmic fashion for a threshold period of time, such as at least 5 seconds or at least 10 seconds. When such a movement is detected, user interface 340 could send a signal to state configuration engine 310 indicating that a jogging or running trigger has been received by the user, and power configuration trigger criteria for running should be used to derive the fabric-level power configuration of personal area fabric 100.

In another embodiment, user interface 340 is automatically configured to detect certain threshold triggers when a combination of nodes are detected in personal area fabric 100 by communication interface 330. For example, software 300 could be configured to look for a snowboarding threshold trigger if it detects that node 130 is a wearable camera, node 120 is a temperature and pulse sensor for the user, and node 150 is a motion sensor for a snowboard worn by the user. Where a user wears all three nodes at once, software 300 could then detect when snowboard shoes have been engaged in a snowboard via node 150, and once those shoes have been engaged, software 300 could send power configuration trigger criteria appropriate for recording the snowboard ride.

Once a power configuration has been selected, state configuration engine 310 analyzes its own node power profile 324 (corresponding to node power profile 224 of FIG. 2), as well as the other node power profiles 321, 322, and 323 collected from other nodes in the fabric (not shown). Power state archive 320 is generally configured to aggregate power profiles from other nodes in the fabric through communication interface 330, which is used to communicate with other nodes through one or more communication protocols (e.g., TCP, UDP, XML or JSON over HTTP, etc.). State configuration engine 310 then derives a fabric-level power configuration 312 for the personal area fabric as a function of the power configuration trigger criteria, which contains ideal power states for all of the nodes in accordance with the power configuration chosen by the user. State configuration engine 310 then sends instructions to each of the nodes through communication interface 330 to alter their state in accordance with derived fabric-level power configuration 312.

Contemplated power configuration trigger criteria can include the following:

a. Criteria to minimize the number of networked nodes in the personal area fabric using one or more communication protocols. Certain communication protocols are very power intensive, such the WiFi communication protocol or the Bluetooth communication protocol. Turning off such communication protocols in a personal area fabric could save on the overall power drain across all nodes in the personal area fabric, but could also limit the capabilities of the node. Criteria to minimize the number of networked nodes using a communication protocol could be used to set forth conditions to allow the nodes to share a communication protocol. For example, criteria to minimize the number of networked nodes in the personal area fabric using WiFi could analyze all the networked nodes to find out which device has the lowest power drain when using WiFi, and then could activate only that node, and allow all other nodes that wish to use the WiFi network to access WiFi through the activated node. Some criteria might include 2 or more WiFi networks simultaneously, for example where a user might want to access a WiFi network having a first SSID and a second SSID. Such criteria might necessitate two nodes having a WiFi communication interface activated, one connecting to the first SSID and the other connecting to the second SSID, and the other nodes configured to access the first or second SSID via the first or second activated nodes instead of through their own WiFi communication interfaces.

b. Criteria to deactivate one or more communication protocols across all of the nodes in a personal area fabric. Such criteria might be used to turn off a communication protocol for a period of time, and is useful in situations where the communication protocol is not useful or is particularly draining. For example, while a user is on an airplane or a remote area such as a skiing mountain or a hiking path, criteria might be set forth to turn off all cellphone and WiFi communication protocols among all nodes. The criteria could also set forth a "search" condition where the communication protocol is turned off among all devices in the personal area fabric, but periodically the system might temporarily activate the communication protocol to detect the existence of an access point, and activate the communication protocol when the existence of the access point is detected. Although more often than not, it makes more sense to have a user indicate when an access point is available by manually sending a second power configuration trigger, either manually through a user interface having a touch screen or button, or automatically by setting forth a location threshold that sends a trigger when the user is detected entering an area via a GPS or RFID locator in a node. Such a criteria might also be useful in situations where power needs to be conserved for other functions, such as when recording an event, or using a computing device to run a processor-intensive application. As such, state configuration engine 310 could be configured to turn off all extraneous communication protocols engine 310 detects that the user is recording an event, or when the user is running a specified application.

c. Criteria to prioritize functionality among nodes of the personal area fabric. Nodes in a network commonly have an increased efficacy when they share resources, such as through a distributed application. The user might activate a function via one or more nodes, which sends a trigger indicating that functionality should be prioritized above other functionalities. For example, when a user is on a teleconference call for work, that user may not want to receive other emails and phone calls, and may not want other applications to be open by the node. The system might detect that the user is on a work teleconference, for example by detecting that a cellphone of the user is connected to a designated number, and could then automatically shut off cellphone communication interfaces on other phones that the user has, shut off WiFi communication interfaces, and shut off applications. A smarter engine could be configured to inventory the set of necessary hardware devices and/or software applications needed by all of the nodes of the personal area network, and activate only that hardware, deactivating all of the unnecessary hardware and/or unnecessary software applications to save on power.

d. Criteria to adjust the power requirements of the personal area fabric to ensure that the personal area fabric has a collective bandwidth at least above a threshold of a collective bandwidth budget. In some scenarios, some of the nodes could be configured collectively transmit or receive data through a plurality of nodes in the personal area fabric. Turning off too many communication interfaces may unduly limit the collective bandwidth, especially if functionality cannot be performed if the collective bandwidth of the nodes falls below a threshold. Accordingly, the state configuration engine preferably pushes criteria, which ensures that the collective bandwidth of the nodes remains above the threshold of the collective bandwidth budget.

e. Criteria to adjust the power requirements of the personal area fabric to ensure that the personal area fabric has a collective power drain below a collective power budget for the personal area fabric. The collective power budget could be expressed in terms of percentage of battery life, but is typically expressed in terms of length of time. Criteria might require the nodes to be active for at least a certain threshold time period.

f. Criteria to adjust the power requirements of the personal area fabric to ensure that the personal area fabric has a collective latency at most at a threshold of a collective latency budget. In some scenarios, the criteria might be used to ensure that data is transmitted to/from the node within a given latency threshold. Turning off too many applications or communication interfaces may unduly slow down data transfer, such as applications which compress/decompress data or communication interfaces that have high bandwidth. Accordingly, the state configuration engine preferably pushes criteria, which ensures that the collective latency of the nodes remains below the threshold of the collective latency budget.

g. Criteria to adjust the power requirements of the personal area fabric to ensure that the personal area fabric has a collective data caching budget. Such criteria might include only the non-transient memory among all of the nodes, but might also include transient memory, since some data only needs to be cached temporarily.

Contemplated node power profiles typically include the following information:

a. A current battery level of the node. Aggregating the current battery level of all of the nodes in the personal area fabric allows state configuration engine 310 to estimate how long each device has to function at various power states.

b. An estimate battery level profile. The estimate battery level profile includes instructions for providing an estimated remaining battery level given historical usage information and available information about known future power consumption events. Preferably each node has a different estimated battery level profile for (a) different node states (if certain hardware components or software applications are turned off, a battery might last longer) and (b) different functionalities performed by a node (if certain functionalities are prioritized and are known to be running, a battery might not last as long).

c. Battery capacity and a battery rechargeability indicator that indicates whether the battery of the particular node is rechargeable. The ability for a battery to be recharged by other nodes is of particular importance where a communication protocol between two nodes, such as a USB wire, allows one node to charge another, effectively distributing battery power from one node to another. The rate of recharge and the historical effectiveness of battery transfer from one node to the next is also an important factor to be considered when deriving an appropriate fabric-level power configuration. Where battery charge could be transferred from one node to another, two nodes could be considered to have an effective combined battery power, such that lowering the power consumption of one node effectively increases the battery life for the other node.

d. A power consumption level. The power consumption level can correspond to actual power being consumed by the node. The power consumption level can also correspond to a consumption profile among a plurality of consumption profiles. For example, the node may have a consumption profile that maximizes the performance of the node at the expense of higher power consumption, a consumption profile to prioritize the duration of the battery's charge while sacrificing performance, a consumption profile for emergency use or a consumption profile used to maximize the battery life when the battery's charge has been almost completely drained. The power consumption level can include the node power consumption level at a current node state and a consumption level for at least one additional possible node state. The node states can include a configurable node functionality, such as functions or applications of the node requiring the use of certain hardware components or having known power consumption requirements. The configurable node functionality can include the ability to enable or disable certain hardware components. A possible node state, for example, can include the operation of one or more of the communication interfaces available to a node.

e. A node position of the node. The node position can include one or more of a physical location relative to the other nodes of a network, an absolute physical location as determined by systems such as GPS, an absolute logical node position (e.g., a network-identified node position, such as an IP address), a relative logical node position (e.g., a network-identified node position relative to the other nodes in the fabric.

Examples can include a local address within the fabric, a hierarchical position within the fabric relative to other nodes, etc.), and a node orientation. Node position could be used to consider whether two nodes having similar functionalities are redundant. For examples, two nodes having cameras on the same position of the body and pointed the same direction might be redundant, influencing the state configuration engine to derive a fabric-level power configuration that deactivates one of the redundant cameras. Or two motion sensors on the same arm of the body might influence the state configuration engine to derive a fabric-level power configuration that deactivates one of the redundant motion sensors.

f. A boundary node identifier. A node can be a boundary node of the fabric, responsible for communications with nodes or devices outside of the fabric. The boundary node identifier can be a global boundary node identifier designating the node as a permanent boundary node within the fabric. Alternatively, the boundary node identifier can be conditional, wherein the node is identified as a boundary node only for certain kinds of communications, for interactions only with certain types of outside nodes or devices, or on a session-only basis. Where a power configuration trigger criteria is configured to minimize a communication protocol used to communicate with devices outside of the personal area fabric, the boundary node could be the node designated to communicate with devices through that communication protocol, influencing other nodes to use the boundary node to communicate with devices outside of the personal area fabric. In some embodiments, the state configuration engine might wish to derive a fabric-level power configuration that spans a plurality of personal area fabrics, in which case power profiles from other nodes would typically be gleaned through the boundary node.

g. Available communication bandwidth information that identifies the total bandwidth capacity of the node, entitled bandwidth of the node within the fabric and the current estimated bandwidth actually available given current node activity. Such information would be particularly useful if a functionality requires streaming data to or from the personal area fabric. For example, where a user wishes to stream a video, the user may need to combine the bandwidth of several nodes to transmit the stream at an appropriate speed, transmitting data packets through several nodes. The power configuration trigger criteria might contain a minimum bandwidth requirement and/or a maximum bandwidth requirement, and could pool bandwidth between several nodes in order to stay above the minimum bandwidth requirement and/or below the maximum bandwidth requirement.

h. Communication interface latency. The node's communication interface latency provides information about the current latency of the one or more communication interfaces of the node. This information can also include predicted latency given known future uses of the nodes communication interfaces.

i. Communication range. The node's communication range given all of the node's available communication interfaces and the use of each of the node's communication interfaces. This can also be affected by location information and power information related to the node. When determining which node has a higher boundary node score or which node is the most appropriate to be the node having an activated communication protocol, the communication range could be an important factor. The power configuration trigger criteria might contain a minimum range that is needed, or a maximum range that is needed, limiting the choices of nodes.

j. Node memory capacity. This could refer to the storage capacity of memory, RAM capacity, caching capacity, buffering capacity, or a combination thereof of the node. A power configuration trigger criteria might require a minimum memory capacity across all nodes, particularly where video is being recorded, or a file is being downloaded.

The power management of the fabric can be performed by the state configuration engine of one or more nodes. In some embodiments, the state configuration engine could migrate from one node to the next. In some embodiments, the fabric-level power configuration would designate the migration of the state configuration engine, for example where the state configuration engine determines that the node where the engine is currently located should be placed in a state with low functionality or a sleep state. The state configuration engine could be software instructions stored within memory or retrieved via the communication interface and executed by the processor to carry out the functions and processes of the inventive subject matter. The state configuration engine could alternatively be one or more dedicated hardware components such as a processor specifically programmed to carry out the functions and processes of the inventive subject matter.

Within a personal area fabric, preferably any node can include a state configuration engine. At minimum, at least one node within the fabric must contain or be able to access a state configuration engine for its execution. In some embodiments, the state configuration engine could be a remote computer system that is accessed through a boundary node. In such embodiments, the remote computer system would send instructions to the individual nodes in the personal area fabric through the boundary node. A given node's ability to contain or access a state configuration engine can be dependent on the node's processing, storage or network capabilities. Since the state configuration engine executes power management functions across the fabric by deriving and then implementing one or more available fabric power configurations through one or more communication interfaces, the state configuration engine is preferably located on a node having a plurality of communication interfaces.

The state configuration engine manages the functions manage the functions of the nodes within the fabric according to the derived fabric-level power configuration in accordance with management conditions, operations or goals derived from the power configuration trigger criteria. The fabric power configuration can be a collection of rules or criteria that are to be applied across some or all of the nodes within the fabric so to meet or comply with fabric-wide power criteria, conditions or requirements. Examples of fabric-wide power criteria, conditions or requirements include the current available power of one or more nodes within a fabric, the current power usage of one or more nodes within a fabric, power requirements of different functionalities of one or more nodes, and anticipated required power by one or more nodes of the fabric for functions at a scheduled or predicted future time. A fabric power configuration can also be related to optimizing the execution of one or more functions of nodes within the fabric given a current power condition.

The fabric power configuration can include one or more of power configuration rules, feature management rules, power conservation rules, communication routing rules and data caching rules for the one or more applicable nodes within the fabric.

The fabric power configuration can include rules applicable on a node-specific basis, wherein the functions of individual nodes within the fabric modified to meet the fabric-wide configuration requirements. The node-specific rules can be based on factors such as a node hierarchy within the fabric, node functionality, node capacity, node power, and node customizability. These factors can be absolute (e.g., a node-specific rule can apply to a node having a certain measurable quantity or characteristic) or relative (e.g., a node-specific rule can apply to a particular node based on its characteristics compared to similar characteristics of other nodes in the fabric).

Examples of the fabric power configuration rules can include rules that cause a particular node to initialize or shut down hardware or software functions, to adjust power consumption, to prioritize certain functions or applications, to make functions of the node accessible or controllable by other nodes, to route communications along designated routes or using designated communication interfaces, and to execute processes or applications associated with other nodes.

Fabric power configurations can be stored in the memory of one or more nodes of the fabric, such as memory 220 in node 140. The fabric power configurations can be obtained by or introduced into the nodes via a variety of ways. For example, fabric power configurations can be preloaded into nodes during the manufacturing of the node devices. Alternatively, the fabric power configurations can be stored in servers or other storage external to the fabric and retrieved as necessary by nodes having the networking capabilities to retrieve data from sources external to the source. Fabric power configurations can contain node identification information that identifies one or more types of nodes to which the fabric power configurations are applicable. These fabric power configurations can then be retrieved by the appropriate nodes via periodic updates, or can be pushed by the state configuration engine to nodes in the personal area fabric. The fabric power configurations can include corresponding power configuration trigger criteria, used to determine whether to invoke a particular power configuration. Alternatively, the fabric power configurations can have associated power configuration trigger criteria stored separately, which can be retrieved by the appropriate nodes within the fabric as needed. In some embodiments, the fabric power configurations themselves can be used solely to push instructions to other nodes to change their state in accordance with a schedule. For example, a state configuration engine accessing a fabric-level power configuration can push an instruction for one node to go to sleep for the next hour or until woken up by a remote signal, and for another node to go into a low-power state by deactivating its WiFi and/or Bluetooth communication interfaces until a new instruction is set.

The use of fabric power configurations reflect power management of a collection of nodes, managed at the fabric level. Therefore, the application of a fabric power configuration can result in rules that cause a particular node to operate in a manner that is contrary to the power management interests of the particular node. For example, a fabric power configuration can cause a first node to perform processing operations typically performed by a second node, thus "sacrificing" the first node's available power supply to extend the second node's power supply.

Figure 4:
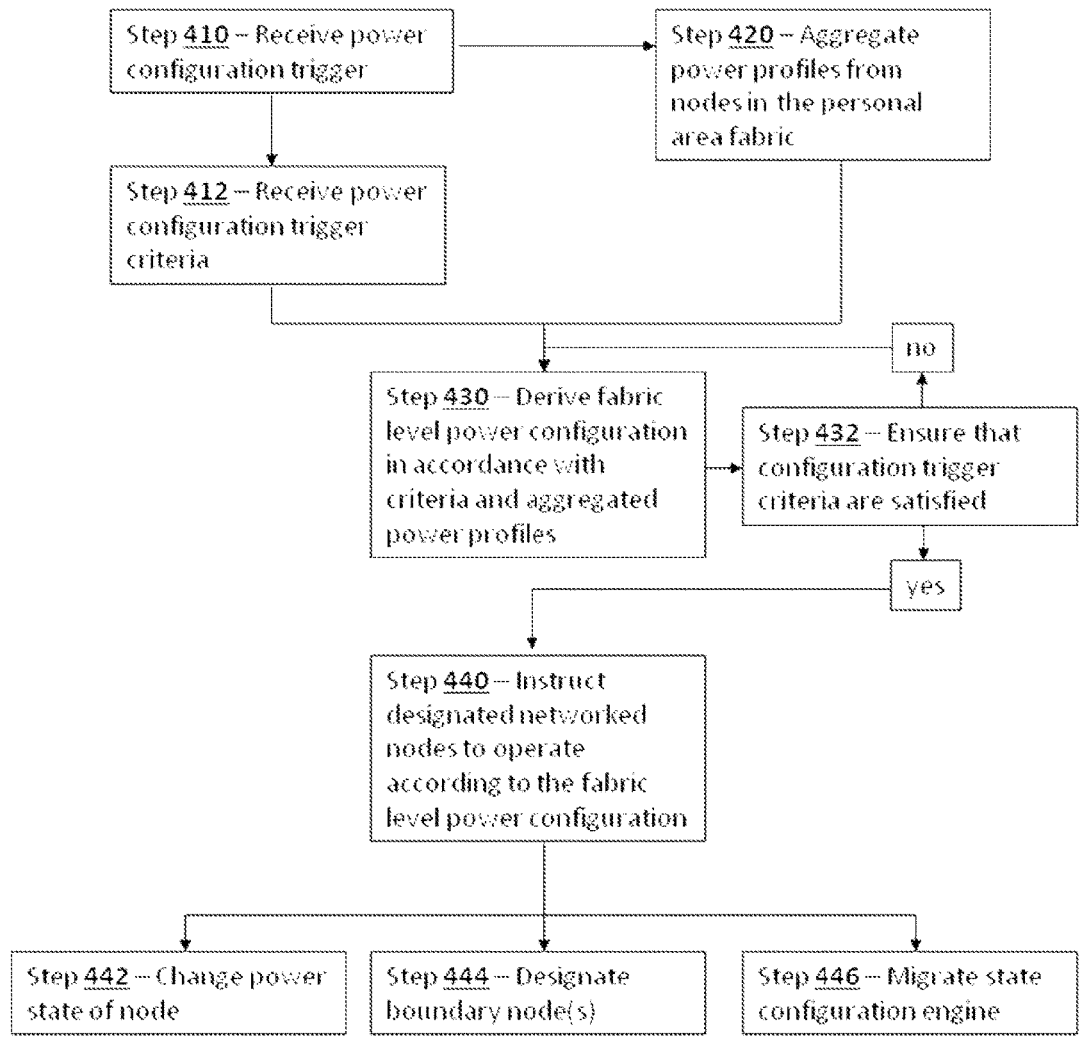
FIG. 4 is a flow chart showing steps carried out by an exemplary state configuration engine.

FIG. 4 is a flowchart illustrating the process executed by the state configuration engine 310, according to an embodiment.

In step 412, the state configuration engine obtains a set of power configuration trigger criteria for one or more of the fabric power configurations available to it. The power configuration trigger criteria can be stored in one or more nodes within the fabric, or can be retrieved from remote storage, such as a server storing the power configuration trigger criteria. Step 412 can be executed periodically or dependant on certain conditions or triggers, such as a change in the configuration of the fabric (e.g., nodes added or removed). These triggers or conditions are illustrated at step 410. In embodiments, a trigger received at 410 can be a power configuration trigger from a user, for example via a user interface or sensor detecting an action by the user.

In one alternative, after an initial retrieval of applicable power configuration trigger criteria by nodes within a fabric, the nodes of the fabric can periodically check for updates to the fabric power configurations and power configuration trigger criteria and download only the updates.

A set of power configuration trigger criteria can include one or more score thresholds or conditions to be met by one or more nodes. The score thresholds can include score thresholds corresponding to one or more categories of the node power profiles as expressed in a collective fabric-level power profile. The score threshold can be a single threshold score that can correspond to a single, collective fabric-level power profile score.

At step 420, the state configuration engine aggregates node power profiles from nodes within the fabric. This can include the node power profile of the node containing the state configuration engine that is executing the process. The node power profiles collected by the state configuration engine can be from all nodes within the fabric or a subset of all nodes within the fabric. The nodes whose power profiles are collected can be selected based on the purpose or functions associated with a particular fabric power configuration.

The state configuration engine uses the collected node power profiles to derive the fabric-level power profile corresponding to the collective number of nodes that contributed node power profiles at step 430. Step 430 can be repeated periodically, as often as necessary to "refresh" the fabric-level power profile and maintain an accurate reflection of the changes to the node power profiles due to operations of the nodes.

The fabric-level power profile can be a representation of the current collective capacity or ability of the nodes to perform a particular function. The fabric-level power profile can also include representations of predicted future collective capacity or ability of the nodes to perform these functions.

For example, the fabric power profile can represent one or more of a collective caching budget, a collective bandwidth budget, a collective latency budget, communication routing images, and a collective communication range budget of one or more of the nodes within the fabric.

A collective caching budget of a collection of nodes in a fabric can represent the ability of the nodes to perform caching functions given one or more power conditions and caching-relevant factors (e.g., storage capacity, communication interface speed and availability, etc.).

A collective latency budget can represent the latency of the nodes 140 for one or more power conditions and latency-related factors, and can also include the ability for the nodes to improve latency conditions based on power conditions and the latency-related factors.

A collective bandwidth budget of a collection of nodes in a fabric can represent the bandwidth available to each node individually as well as the collection of nodes in the fabric, based on one or more power conditions and bandwidth-related factors.

A communication routing image can include information related to different communication routes between nodes within the fabric as well as to nodes or devices outside of the fabric, based on one or more power conditions and communication-related factors (e.g., distance between nodes in a fabric, current traffic within the routes, the communication interfaces available to any nodes in the route, etc.). The information can include route efficiency information, communication route speed information and information related to the reliability of the routes.

The fabric-level power profile can include aggregated values or calculated scores corresponding to categories of a node power profile.

For some categories of a node power profile, the fabric-level power profile score can be a cumulative aggregation of the individual nodes. For example, a fabric-level power profile can include a score corresponding to the total memory capacity of all of the nodes 100 in the fabric.

For other categories, the fabric-level power profile score can be based on the "weakest link" of the nodes in the fabric. For example, the fabric-level power profile score for a battery-related category can be based on the node having the lowest-capacity battery or the lowest remaining power.

The fabric-level power profile score can be based on ratios between categories of a node power profile. For example, the fabric-level power profile score can be based on ratio between a maximum processing capability of the node and the power consumption of the node when operating at maximum processing capability.

The fabric-level power profile can be a combined or collective score calculated as a function of the node power profiles. For a particular fabric-level power profile, the categories in the node power profile can be weighted according to their importance or relevance to the particular fabric-level power profile. A score can be generated for each node power profile of one or more nodes within a fabric, and the scores for each node combined to result in the fabric-level power profile.

At step 432, the state configuration engine checks to see whether the configuration trigger criteria has been met by the fabric-level power profile. If so, the state configuration engine implements the fabric power configuration at step 440. The fabric power configuration can be implemented by causing the applicable nodes to operate according to the fabric power configuration. If the trigger criteria is not met at step 432, the state configuration engine can periodically re-run the check (illustrated by the "no" option in flowchart of FIG. 4 at step 430). This periodic re-checking can be performed in synchronization with the refreshing of the fabric-level power profiles described above, or on its own schedule. Additionally, if the trigger criteria are not met, the state configuration engine can determine the difference between the fabric-level power profile and the triggering criteria, and store this result. As the state configuration engine re-generates the fabric-level power profile or re-executes the check with a trigger criteria, the state configuration engine can use the stored historical comparison results to determine trends, allowing for the prediction of when the trigger criteria will be met.

The fabric power configuration can be implemented by the state configuration engine as a state change at step 442, at the fabric-level that remains in place until expiration. This way, it is not necessary to repeat the comparison of fabric power level profiles to this specific triggering criteria, or to continue to periodically generate fabric power level profiles specifically applicable to the fabric power configuration. The expiration can be a timed expiration to coincide with a function or process to be performed by the fabric that is associated with the implemented fabric power configuration, after which the nodes in the fabric return to a default operation or to operation according to a prior fabric power configuration. The expiration can be the implementation of a new fabric power configuration that supersedes the current fabric power configuration.

Alternatively, the state configuration engine can periodically check to ensure that the fabric-level power profile continues to satisfy the trigger criteria after the implementation of the fabric power configuration associated with the criteria in step 440. This allows for the implementation of a fabric power configuration on an "as-needed" basis, and only for the necessary duration. For example, a fabric power configuration used to maximize the duration a fabric's collective battery power can have triggering criteria of a threshold remaining battery level of the fabric or of one or more hierarchically important nodes within the fabric. Upon crossing this threshold, the fabric power configuration causes nodes within the fabric to operate in 'battery-saving' modes until the threshold is no longer met (due to, for example, one or more nodes being charged). By continuing to check whether the triggering criteria continue to be met, the state configuration engine can "release" the fabric to resume "normal" operation as soon as possible.

The fabric-level power profile derived by the state configuration engine can be a current fabric-level power profile, based on current aggregated node power profiles, derived to accurately reflect the current fabric power level. Additionally, the state configuration engine can derive predicted fabric-level power profiles by modifying the collected node power profiles based on trend information or scheduled future events. The state configuration engine can determine if or when any of the predicted fabric-level power profiles will meet the trigger criteria. Based on the prediction information, the state configuration engine can elect to delay the implementation of a fabric power configuration even if the triggering criteria is met, or alternatively, cause the implementation of a fabric power configuration even though the fabric-level power profile does not satisfy the power configuration trigger criteria.

As described above, as few as one node and as many as all nodes within the fabric can include a state configuration engine. In embodiments, the state configuration engine can migrate from one node to another (at step 446) in response to a new fabric-level power configuration. In fabrics where multiple state configuration engines are present, each individual state configuration engine can conduct the processes independently and communicate its result to all other state configuration engines within the fabric. In the event that the results of all the state configuration engines do not coincide within a certain tolerance, the winning 'result' can be determined to be the 'result' having the highest commonality among the state configuration engines (i.e., the result calculated by the highest number of individual engines). Conflicts can also resolved by weighing results according to a hierarchy of nodes with the fabric. The hierarchy of nodes can be established according to a variety of characteristics of each of the nodes or of the node power profile associated with each of the nodes (e.g., processing capacity, storage capacity, communication capacity, battery capacity, physical or logical node location within the fabric, etc.). This hierarchy, once established, can be absolute to the fabric and dependent only on the addition or subtraction of nodes to the fabric. Alternatively, this hierarchy can be adaptable based on current or predicted fabric power configurations of the fabric.

Alternatively, the need for more than one and up to all available state configuration engines to calculate the process can be avoided by the designation of a node within the fabric as a manager node. The state configuration engine of the manager node has the authority to cause other nodes to operate according to a particular fabric configuration. The designation of the manager node can migrate based on changing conditions of the nodes within the fabric and of the fabric as a whole.

The manager node can be designated based on the node power profiles gathered from each node. To designate a manager node, the state configuration engine can derive manager node scores for each of a plurality of the nodes in the fabric based on each node's power profile. The manager node scores can be based on the entirety of a node power profile or on a subset of the characteristics of a node represented in a node power profile. The calculation of the manager node score can be adjusted to emphasize specific aspects or characteristics of the nodes (e.g., processing power, communication capacity or interfaces, memory capacity, node location) or a particular fabric power configuration. From the calculated scores, the state configuration engine can select a set of candidate nodes. The state configuration engine can then designate a node from the set of candidate nodes as the manager node. The selection of the manager node from the set of candidate nodes can be based on the manager node score (e.g., highest overall) or on other tie-breaking characteristics within the node power profile. The remaining nodes within the set of candidates can be organized as a hierarchical "back-up" list in the event that the manager node is unexpectedly disabled or lost.

The state configuration engine of the manager node can be responsible for designating new manager nodes as necessary to account for changes in the fabric, such as in the node power profiles of the nodes.

The state configuration engine of the manager node can further be responsible for managing communications between the fabric and external nodes or external fabrics.

It is possible that, in a fabric, not all nodes will have the capability to communicate with external devices or nodes that are outside the fabric. In other instances, it may be desirable to limit a particular node's abilities to communicate with external devices in the interests of the power management of the fabric as a whole. Interactions between the fabric as a whole, and external nodes or other fabrics is managed via a boundary layer.

A boundary layer of a fabric can be one or more nodes having the capacity and authority to communicate with external nodes (or external fabrics having a plurality of nodes). A fabric may have several boundary layers simultaneously, made up of different nodes or different combinations of nodes. The different boundary layers of a fabric can overlap in part of in whole, or can be completely independent of one another. The boundary layers of a fabric can include a default boundary layer and additional, "specialized" boundary layers such as node- or device-specific boundary layers, application-specific boundary layers, communication-specific boundary layers, and fabric power configuration-specific boundary layers.

To designate a default boundary layer, the state configuration engine derives default boundary node scores for nodes within the fabric, where the default boundary node scores can be derived from the node power profiles of the nodes. The default boundary node scores are used to select a set of candidate boundary nodes. The state configuration engine then designates one or more nodes from the set of candidate boundary nodes as the default boundary nodes for the fabric. The designation of the nodes for the default boundary nodes for the fabric can be made based on the rankings of the determined boundary node scores, or based on specific node characteristics such as a node's power capacity or a node having the most available communication options. The designation of one or more boundary nodes is illustrated via step 444 of FIG. 4, whereby the changing of the fabric-level power configuration can also cause the re-determination of boundary nodes. However, it is contemplated that the designation of boundary nodes can occur periodically, in response to other triggers, or according to other rules.

For the designation of a specialized boundary layer, boundary node scores can be calculated with an emphasis on characteristics of the node power profiles and the fabric as a whole.

For example, a state configuration engine receives a communication request from one or more external nodes. The communication request can be received via the default boundary layer nodes and relayed to the state configuration engine. The state configuration engine can derive a boundary node score for each node based on each nodes power profile and also the communication request and designate one or more nodes as boundary nodes for communicating with the one or more external nodes based on the calculated boundary node scores. The state configuration engine can then authorize or cause the designated boundary nodes to communicate with the one or more external nodes.

The use of the communication request in the determination of the boundary layer can allow for the boundary layer to be made up of nodes that best fit the nature of the communication and the power management interests within the fabric. For example, the communication request can influence the calculation of the boundary layer scores by indicating particular communication interfaces that are preferred or required, that the communication is originating from a particular type of node, is targeted at a specific type of node within the fabric, or is related to the execution a particular application. These indicators can add weight to related characteristics of the nodes during the calculations of the boundary layer scores.

The communication request received from one or more external nodes can include one or more external node power profiles corresponding to the external nodes.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A personal area fabric, comprising:
a plurality of networked nodes, wherein each networked node comprises a node power profile and a short range communication interface configured to exchange data with at least one other networked node of the plurality of networked nodes and wherein each networked node is positioned to be able receive communication via the short range communication interface from at least one other networked node of the plurality of networked nodes;
wherein at least one of the plurality of networked nodes has a state configuration engine configured to, when executed by a processor: receive a power configuration trigger;
aggregate node power profiles from a portion of the plurality of networked nodes;
derive a fabric-level power configuration as a function of the aggregated node power profiles by designating a subset of the portion of the plurality of networked nodes as boundary nodes, wherein the fabric-level power configuration only allows communication outside the personal area fabric via at least one of the boundary nodes; and
instruct the portion of the plurality of networked nodes to operate according to the fabric-level power configuration in response to the power configuration trigger.

2. The personal area fabric of claim 1, wherein the power configuration trigger is received via a user interface comprising a menu configured to present a list of user-selectable configuration profiles.

3. The personal area fabric of claim 1, wherein the power configuration trigger is received via a user interface comprising a motion sensor configured to detect an activity of a user of the user interface.

4. The personal area fabric of claim 1, wherein the power configuration trigger comprises a command to minimize a number of the plurality of networked nodes using a first communication protocol.

5. The personal area fabric of claim 1, wherein the power configuration trigger comprises a first command to deactivate a first communication protocol among all of the plurality of networked nodes.

6. The personal area fabric of claim 5, wherein the power configuration trigger further comprises:
a second command to temporarily activate the first communication protocol for at least one of the plurality of networked nodes to detect an existence of an access point; and
a third command to activate the first communication protocol among all of the plurality of networked nodes when the existence is detected.

7. The personal area fabric of claim 5, wherein the state configuration engine is configured to receive a second power configuration trigger through a user interface, wherein the second power configuration trigger comprises a second command to activate the first communication protocol among all of the plurality of networked nodes.

8. The personal area fabric of claim 1, wherein the power configuration trigger comprises a command to prioritize a functionality of a subset of the plurality of networked nodes.

9. The personal area fabric of claim 8, wherein the command to prioritize the functionality of the subset comprises:

inventorying a set of needed hardware of the subset needed for the functionality; and
deactivating a set of unnecessary hardware of the subset not needed for the functionality.

10. The personal area fabric of claim 1, wherein the state configuration engine is configured to derive the fabric-level power configuration by dictating at least one of three active states of at least one of the plurality of networked nodes.

11. The personal area fabric of claim 1, wherein the state configuration engine is configured to derive the fabric-level power configuration by dictating at least one of four active states of at least one of the plurality of networked nodes.

12. The personal area fabric of claim 1, wherein the fabric-level power configuration is derived as a function of a collective bandwidth budget for the portion of the plurality of networked nodes.

13. The personal area fabric of claim 1, wherein the fabric-level power configuration is derived as a function of a collective power budget for the portion of the plurality of networked nodes.

14. The personal area fabric of claim 1, wherein the fabric-level power configuration is derived as a function of a collective latency budget for the portion of the plurality of networked nodes.

15. The personal area fabric of claim 1, wherein the fabric-level power configuration is derived as a function of a data caching budget for the portion of the plurality of networked nodes.

16. The personal area fabric of claim 1, wherein the state configuration engine is configured to migrate to another node of the plurality of networked nodes.

17. The personal area fabric of claim 1, wherein the state configuration engine is further configured to designate at least one node of portion of the plurality of networked nodes as a default boundary node based on a ranking of the default boundary node scores.

18. The personal area fabric of claim 1, wherein the communication interface comprises at least one wireless short range communication interface.

19. The personal area fabric of claim 18, wherein the at least one short range wireless communication interface includes at least one of near-field communication, Bluetooth and Wi-Fi Direct.

20. A personal area fabric, comprising:
a plurality of networked nodes, wherein each networked node comprises at least one short range communication interface configured to exchange data with at least one other networked node among the plurality of networked nodes and wherein each networked node is positioned to be able receive communication via the short range communication interface from at least one other networked node of the plurality of networked nodes;
wherein at least one of the plurality of networked nodes further comprises a sensor;
wherein at least one of the plurality of networked nodes includes two or more operating power states;
wherein at least one of the plurality of the networked nodes includes a node power profile;
wherein at least one of the plurality of networked nodes further comprises a non-transient computer readable memory, a processor, and computer readable instructions configured to, when executed by said processor:
receive data from a sensor of at least one of the plurality of networked nodes;
derive a fabric-level power configuration of the plurality of networked nodes as a function of one or more node power profiles by designating a subset of the portion of the plurality of networked nodes as boundary nodes, wherein the fabric-level power configuration only allows communication outside the personal area fabric via at least one of the boundary nodes; and instruct, in response to sensor data, at least one of the plurality of networked nodes to operate at an operating power state as a function of the derived power configuration.

21. The personal area fabric of claim 20, wherein the sensor data includes contextual information based on ambient sensor data.

22. The personal area fabric of claim 20, wherein the sensor is a motion sensor configured to detect an activity of a user.

23. The personal area fabric of claim 20, wherein the sensor detects user commands.

24. The personal area fabric of claim 20, wherein the sensor detects user commands through a user interface.

25. The personal area fabric of claim 24, wherein the user interface is a touch screen.

26. The personal area fabric of claim 20, wherein the sensor comprises at least one of the following: a motion sensor, an accelerometer, a gyroscope, a location sensor, conductive leads, a GPS receiver, a compass, a PH detector, a piezoelectric lead, temperature sensor, an image sensor, a camera, a microphone, and a light sensor.

27. The personal area fabric of claim 20, wherein derived power configuration dictates the instruction to at least one of the plurality of networked nodes to operate at a least one of three operating power states.

28. The personal area fabric of claim 20, wherein derived power configuration dictates the instruction to at least one of the plurality of networked nodes to operate at a least one of four operating power states.

29. The personal area fabric of claim 20 wherein the fabric-level power configuration is further derived from a communication routing image.

30. The personal area fabric of claim 20, wherein the short range communication interface comprises at least one short range wireless communication interface.

31. The personal area fabric of claim 30 wherein the at least one short range wireless communication interface includes at least one of near-field communication, Bluetooth and Wi-Fi Direct.

32. The personal area fabric of claim 20, wherein the short range communication interface comprises at least one of a wired connection, A/V plug, USB plug near-field communication, Bluetooth and Wi-Fi Direct.

33. The personal area fabric of claim 20, wherein at least one of the networked nodes of the plurality of networked nodes is positioned in at least one of the following locations: on a human body, attached to clothing on a human body, attached to an object attached to a human body, within reach of a human body and within a vehicle in which a human body is situated.

34. The personal area fabric of claim 20, wherein at least one of the networked nodes of the plurality of networked nodes is positioned within five meters of a body of a user.

35. The personal area fabric of claim 20, wherein at least one of the networked nodes of the plurality of networked nodes is positioned within one meters of a body of a user.

36. The personal area fabric of claim 1, wherein the short range communication interface comprises at least one of a wired connection, A/V plug, USB plug near-field communication, Bluetooth and Wi-Fi Direct.

37. The personal area fabric of claim 1, wherein at least one of the networked nodes of the plurality of networked nodes is positioned in at least one of the following locations: on a human body, attached to clothing on a human body, attached to an object attached to a human body, within reach of a human body and within a vehicle in which a human body is situated.

38. The personal area fabric of claim 1, wherein at least one of the networked nodes of the plurality of networked nodes is positioned within five meters of a body of a user.

39. The personal area fabric of claim 1, wherein at least one of the networked nodes of the plurality of networked nodes is positioned within one meters of a body of a user.

\* \* \* \* \*